Dec. 6, 1927.
R. C. BENNER
1,651,989
ACTIVE MATERIAL SUPPORT FOR STORAGE CELLS
Filed Sept. 6, 1922
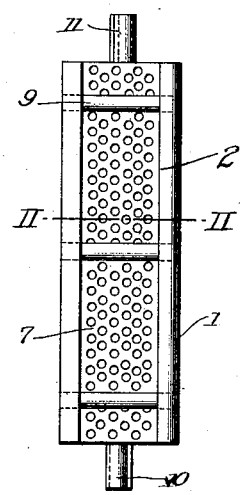
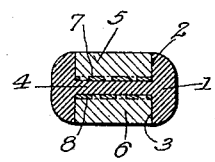
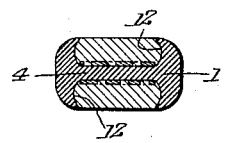
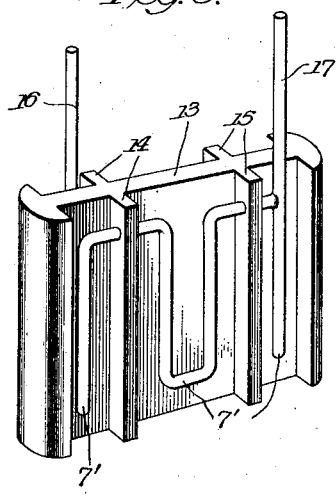
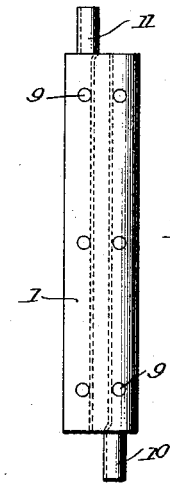
Inventor:
Raymond C. Benner,
By Byrnes, Townsend & Brickenstein
Attorneys.

Patented Dec. 6, 1927.

1,651,989

UNITED STATES PATENT OFFICE.

RAYMOND C. BENNER, OF BAYSIDE, NEW YORK, ASSIGNOR, BY MESNE ASSIGNMENTS, TO PREST-O-LITE STORAGE BATTERY CORPORATION, A CORPORATION OF INDIANA.

ACTIVE-MATERIAL SUPPORT FOR STORAGE CELLS.

Application filed September 6, 1922. Serial No. 586,484.

This invention relates to supports for the active material of storage cells, particularly the small cells destined for use in battery hand lamps or other portable battery-operated devices. The principal object of the invention is to provide improved non-conductive supports of light weight, having simple and effective means for retaining the active material and conducting the electric current.

Insulating materials such as celluloid, rubber, and wood have heretofore been used in the manufacture of active material supports, as by the substitution of such supports for lead grids a materially lighter cell is produced. In accordance with the present invention improved non-conductive supports, carrying both positive and negative active materials on opposite sides, are provided.

I am aware that supports adapted for use in hand lamp cells or the like have been constructed to carry both positive and negative active materials, the two materials lying for example, in adjacent compartments on the same side of the support. With such an arrangement, current leakage between the materials is a frequent result. This defect is corrected in the present construction and positive advantages are secured.

Reference is to be made to the accompanying drawing, in which

Fig. 1 is a side elevation of a support especially adapted for use in hand lamp cells;

Fig. 2 is a horizontal section on line II—II, Fig. 1, but showing the active materials in position;

Fig. 3 is a view similar to Fig. 2, showing a modification;

Fig. 4 is a side elevation of the support shown in Figs. 1 and 2; and

Fig. 5 is a perspective view of a modified form of support.

In the drawings, reference numeral 1 denotes a non-conductive support having the proper length and rounded contour to adapt it for use in tubular cells. Any light, non-conductive material capable of resisting the action of the electrolyte may be used in the manufacture of the support. Hard rubber is in general preferable but celluloid, wood, or other materials may be used.

The support 1 has opposed grooves 2 and 3 running throughout its length. The partition 4 separates the two grooves and prevents contact between the positive and negative active materials 5 and 6.

The active materials are held in place by engagement with the perforations of the conductive plates 7 and 8 secured in the bottom of grooves 2 and 3, and by transverse metal rods 9. The plates 7 and 8 may advantageously be made of thin sheet lead, which provides a good conductive path for the electric current without objectionably increasing the weight of the support. Terminals 10 and 11 are connected respectively to plates 7 and 8. The grooves for the active materials may have undercut sides, as shown at 12 in Fig. 3, for more securely retaining the active material.

The constructions so far described are designed especially for use as unitary sources of current. A hand lamp, for example, may be provided with a cell or cells comprising electrolyte and the support 1 carrying active materials and immersed therein. The current will flow around the support from one body of active material to the other. The internal resistance of cells so constructed is well adapted to the purpose for which they are intended. A further advantage lies in the exposure of the active material only at the surface of the grid, the conductors being embedded. This results in a marked decrease of local action, especially while on shelf, and a corresponding increase in service life.

In Fig. 5 a support of modified form is illustrated. This comprises a plate 13 having rounded flanged ends, and vertical ribs 14 and 15 on each side. The ribs are perforated to permit passage of a lead strip 7' or other conductor, which is extended through each of the compartments formed by the ribs and ends. Positive and negative active materials are to be packed on opposite sides of the support 13. Current is conducted through the active material and lead strips to terminals 16 and 17. The device of Fig. 5 is best used in assemblies in which a plurality of the supports are placed with their positive and negative surfaces in opposition.

Various modifications of the specific constructions shown herein may be made within the scope of the appended claims.

I claim:

1. A bi-polar electrode element comprising a non-conductive member having cavities on opposite sides thereof, active materials in said cavities, the material on one side being of diverse polarity to that on the opposite side, said member also comprising an imperforate partition wall separating said cavities and insulating the respective bodies of active material from each other, and terminals electrically connected to the respective bodies of active material, whereby, when said electrode element is immersed in electrolyte and the circuit through said terminals is closed, current will flow around the support from one body of active material to the other.

2. A bi-polar electrode element comprising a non-conductive member having cavities on opposite sides thereof, active materials in said cavities, the material on one side being of diverse polarity to that on the opposite side, conductive means in said cavities to retain the active materials in said cavities and to make contact with such materials, said member also comprising an imperforate partition wall separating said cavities and insulating the respective bodies of active material from each other, and terminals electrically connected to said conductive means, whereby, when said electrode element is immersed in electrolyte and the circuit through said terminals is closed, current will flow around the support from one body of active material to the other.

3. A bi-polar electrode element comprising a non-conductive member having cavities on opposite sides thereof, active materials in said cavities, the material on one side being of diverse polarity to that on the opposite side, said member also comprising an imperforate partition wall separating said cavities and insulating the respective bodies of active material from each other, said member being further provided with overhanging edge portions at the sides of the respective cavities to aid in retaining the active materials therein, and terminals electrically connected to the respective bodies of active material, whereby, when said electrode element is immersed in electrolyte and the circuit through said terminals is closed, current will flow around the support from one body of active material to the other.

In testimony whereof, I affix my signature.

RAYMOND C. BENNER.